(12) United States Patent
Tarlow et al.

(10) Patent No.: US 7,100,953 B1
(45) Date of Patent: Sep. 5, 2006

(54) GRIP AND FLIP BARBEQUE UTENSIL

(76) Inventors: Kenneth A Tarlow, 21 Golden Hind Passage, Corte Madera, CA (US) 94925; Gary A. Zimmerman, 1641 E. Sunset Rd #116, Las Vegas, NV (US) 89119

(*) Notice: Subject to any disclaimer, the term of this patent is extended or adjusted under 35 U.S.C. 154(b) by 0 days.

(21) Appl. No.: 11/055,422

(22) Filed: Feb. 11, 2005

(51) Int. Cl.
    *A47J 43/28* (2006.01)
(52) U.S. Cl. .......................................... 294/8; 294/104
(58) Field of Classification Search .................. 294/3, 294/7, 8, 10, 104, 19.1; 99/394, 395, 397
    See application file for complete search history.

(56) References Cited

U.S. PATENT DOCUMENTS

| | | | | |
|---|---|---|---|---|
| 1,326,570 A | * | 12/1919 | Burmeister | 294/8 |
| 2,031,183 A | * | 2/1936 | Sonnenburg | 294/7 |
| 2,033,635 A | * | 3/1936 | Imschweiler | 294/8 |
| 2,621,957 A | * | 12/1952 | Hartrampf | 294/8 |
| 2,643,907 A | * | 6/1953 | Thomas | 294/7 |
| 3,761,120 A | * | 9/1973 | Binkert | 294/8 |
| 4,844,525 A | * | 7/1989 | Tarlow et al. | 294/7 |
| 5,634,679 A | * | 6/1997 | Hilderbrandt | 294/8 |
| 6,193,289 B1 | * | 2/2001 | Brown | 294/8 |

* cited by examiner

*Primary Examiner*—Dean J. Kramer
(74) *Attorney, Agent, or Firm*—Michael Shippey; Law Offices of Karla Shippey

(57) ABSTRACT

Grip and flip barbeque utensil with a handle housing, a pair of concentrically arranged elongated tubes, a spatula member, a food gripping member, a pivot shaft, a food gripping tip, a yoke portion, gripping ball chain, flipping ball chain, grip trigger and a flip trigger. The gripping member is attached to the yoke portion straddling the end of the inner tube. The gripping ball chain is attached to the pivoting gripping member and extends through the inner tube to the gripping trigger. The gripping member is caused to rotate downward toward the spatula member when the gripping trigger is pulled. When the flipping trigger is pulled, the gripping member and the spatula member are caused to rotate one hundred and eighty degrees thereby creating a flipping action. A preferred embodiment includes a temperature sensor and associated sensing electronics and temperature display located within the handle housing.

3 Claims, 4 Drawing Sheets

GRIP AND FLIP BARBEQUE UTENSIL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

U.S. Pat. No. 4,844,525 issue date Jul. 4, 1989. Title "Combination Barbeque Fork and Spatula Tool" by Kenneth A. Tarlow and Gary A. Zimmerman

BACKGROUND OF THE INVENTION

This invention relates generally to the field of cooking tools and more specifically to a grip and flip barbeque utensil.

Barbeque tools are quick and handy for turning over and removing steaks, chops, fish, and the like. They generally consist of tools such as a fork, a tong and a spatula. In an effort to combine these tools, my U.S. Pat. No. 4,844,525 issued in July of 1989 disclosed a combination fork with spatula tool that would grip foods between a food holding portion and the fork portion by the action of the user pulling on a trigger located within the handle of the tool. However, my original embodiment of a combination barbeque tool has several deficiencies.

First, my original tool was somewhat difficult to use in that once the food item was gripped, it required an awkward twisting of the user's wrist to flip the item over and then an equally awkward release movement to remove the food item from the tool. Second, there was no way to be sure that a grilled food item was fully cooked before it was removed from the grill

BRIEF SUMMARY OF THE INVENTION

The primary object of the invention is to provide a barbeque utensil that can grip, lift and flip an item of food being grilled in a standard barbeque grill without the need to twist one's wrist in the process. It is a further object of the invention to provide a barbeque utensil that can measure and display the temperature of the food being cooked while in the process of gripping and flipping the food item.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, were is disclosed a Grip and flip barbeque utensil comprising: a handle housing, an outer elongated tube, an inner elongated tube, a first and second bushing, a spatula member, a food gripping member, a pivot shaft for said food gripping member, a food gripping tip a yoke portion, a food gripping torsion spring, a food flipping torsion spring, gripping ball chain, flipping ball chain, grip trigger, flip trigger, first bead chain pulley guide, and second bead chain pulley guide, said inner and outer tubes concentric with one and other, said outer tube fixedly attached at one end to said handle housing end, said inner tube supported within said outer tube by said first and second bushing, said gripping member attached to said outer tube, and said yoke portion straddling and fixedly attached to the distal end of said inner tube, said gripping ball chain attached to said pivoting gripping member and extending within said inner tube to said gripping trigger, said gripping member caused to rotate downward toward said spatula member when said gripping trigger is pulled, said first chain pulley fixedly attached to the outside of said outer tube, said second chain pulley attached by a shaft within said hollow handle housing, said flipping ball chain threaded around said first and second pulleys so that when said flipping trigger is pulled said gripping member and said spatula member are caused to rotate one hundred and eighty degrees thereby creating a flipping action, and said gripping and flipping torsion springs capable of returning said gripping member and spatula member to their original positions.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE DRAWINGS

Figure 1:
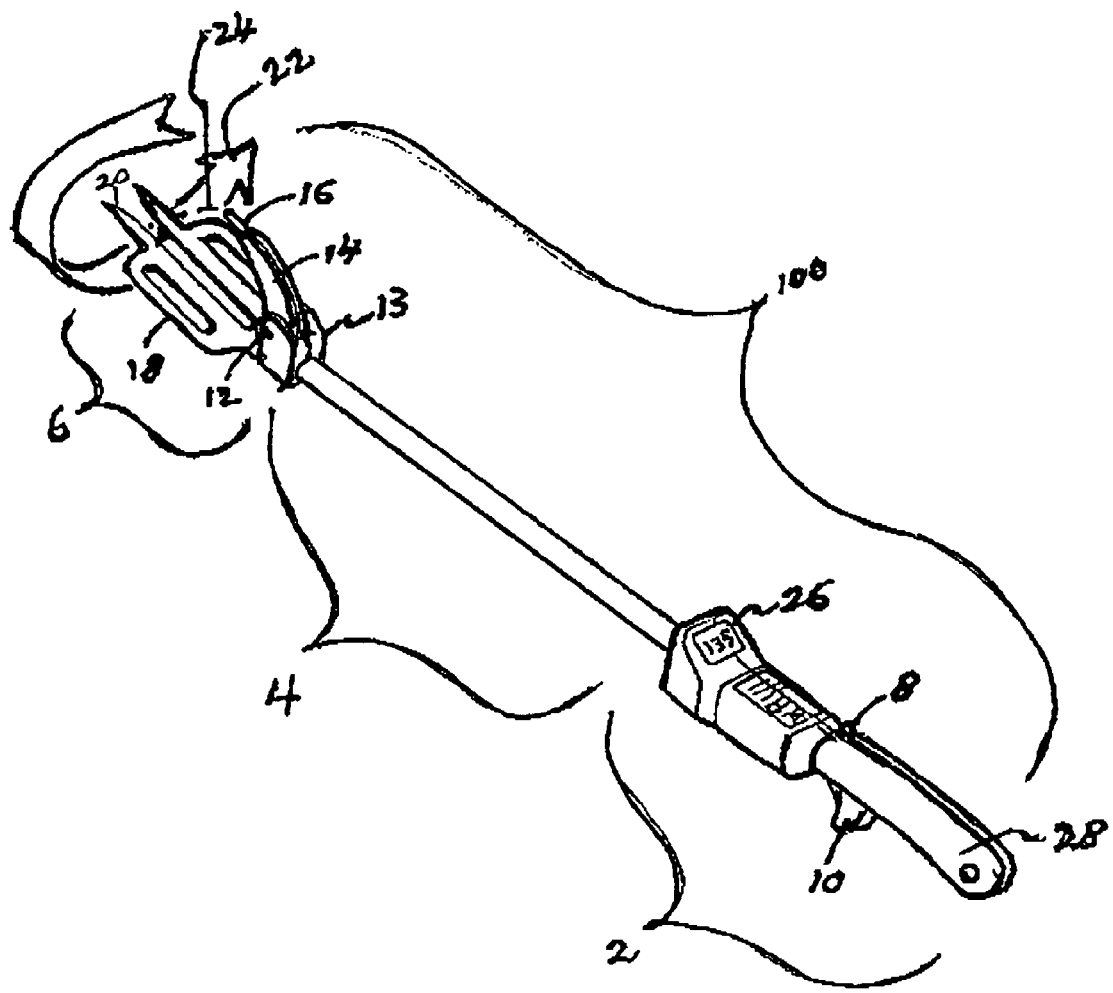
FIG. 1 is a perspective view of the invention 100
Figure 2:
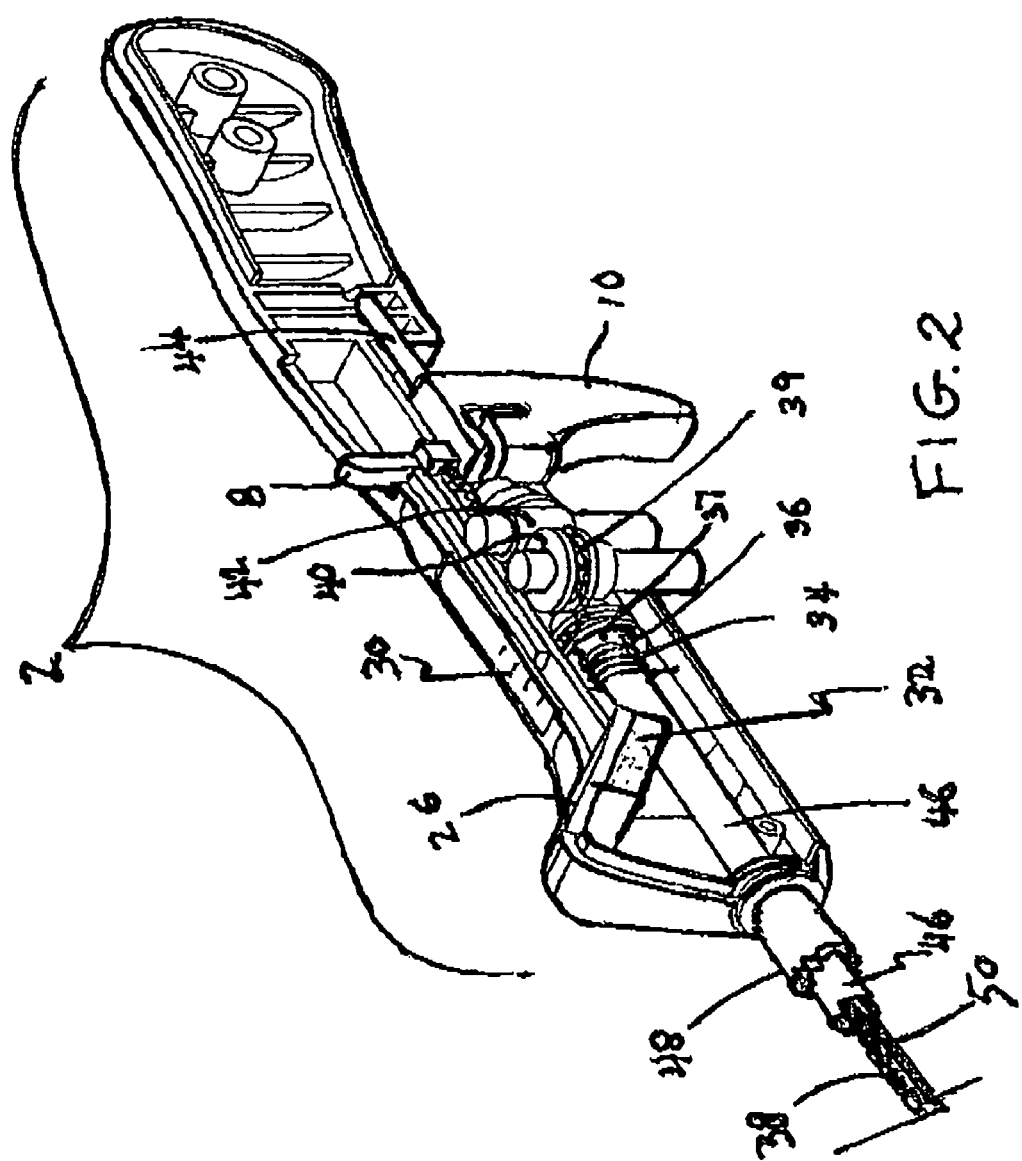
FIG. 2 is a perspective side section view of the handle portion of the invention.
Figure 3:
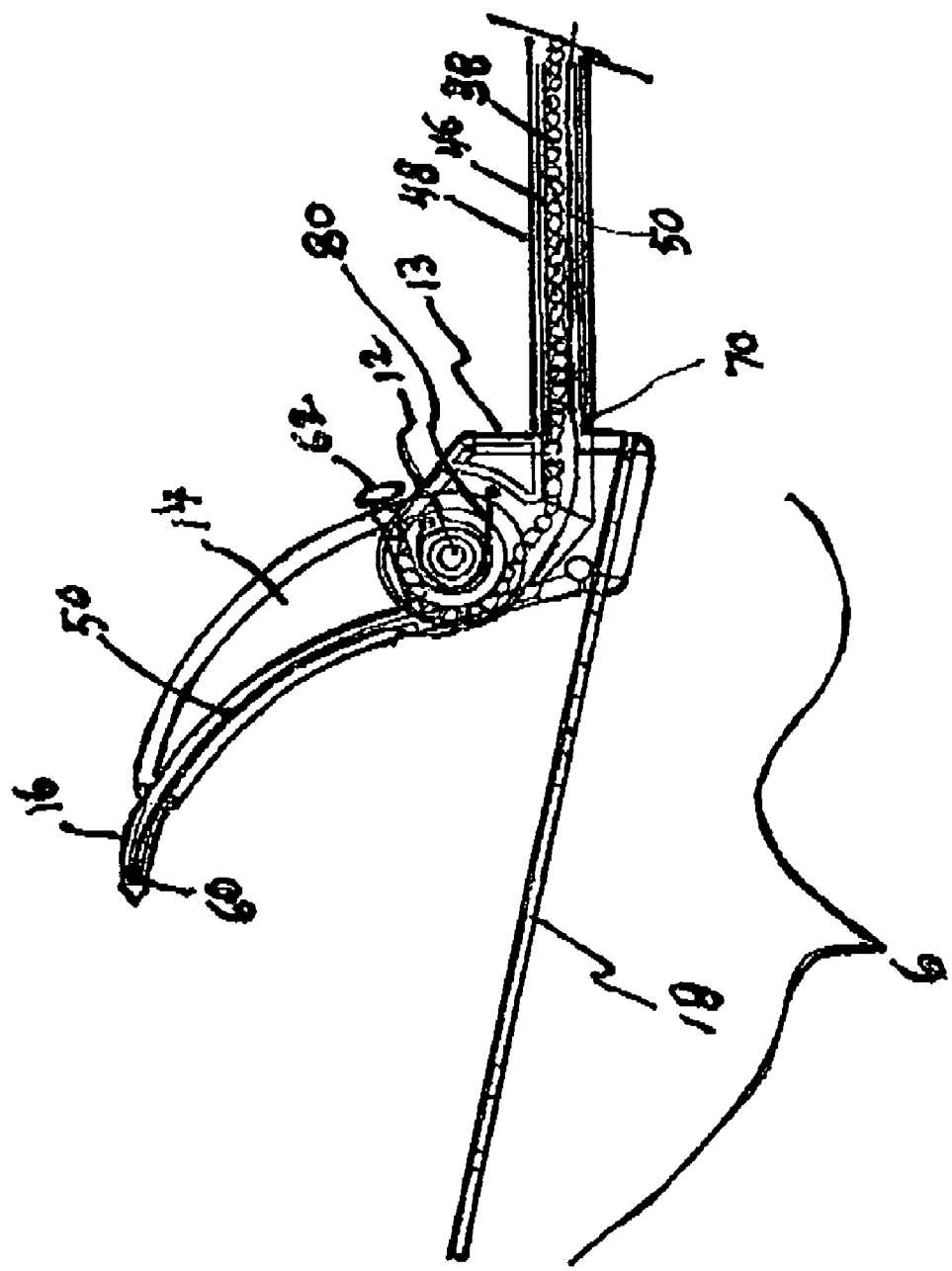
FIG. 3 is a side section view of the grip and flip portion of the invention.
Figure 4:
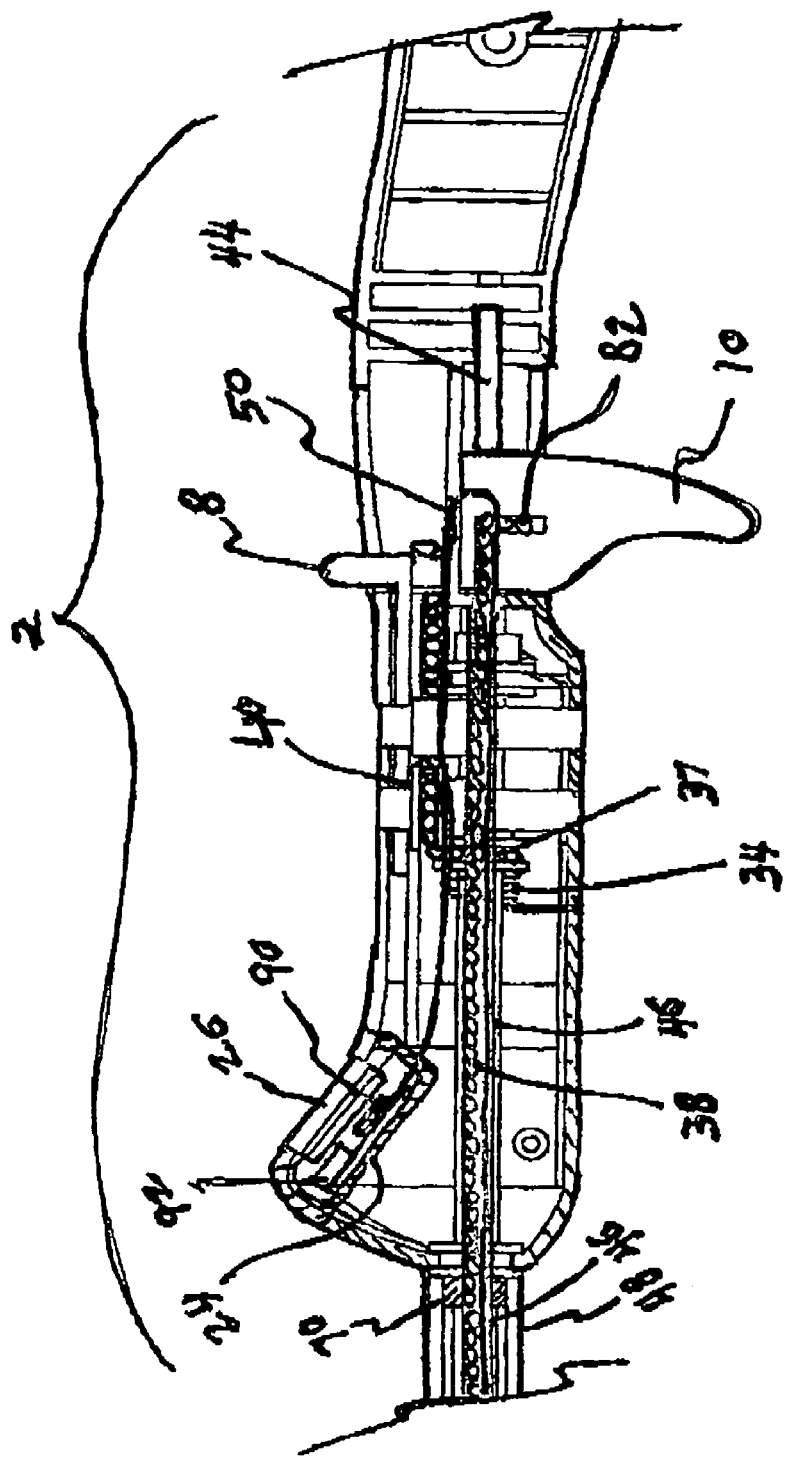
FIG. 4 is a side section view of the handle portion of the invention.

Referring now to FIG. 1 we can see that the barbeque tool 100 of the present invention consists of a handle portion 2 an elongated tube portion 4 and a grip and flip portion 6. The handle portion 2 includes a grip trigger 10, a flip trigger 8 and an LCD temperature readout 26. By pulling grip trigger 10, the user causes gripping member 14 and grip tip 16 to rotate about pivot shaft 12 causing the grip tip 16 to travel down to spatula member 18 as shown by dotted line 24. This action can trap and grip a grilled item for the purpose of turning or removing the grilled item. Spatula member 18 also includes fork tines 20 so that the user can spear and lift a grilled item in the standard way. When the user pulls on trigger 8 with his or her thumb, it causes the entire grip and flip member to rotate one hundred and eighty degrees as shown by arrow 22. Additionally, when the user performs a gripping action, the grip tip 16 penetrates the item being grilled. The tip includes within ft, a temperature sensor, so that the temperature of the grilled item can be read via LCD display 26. FIG. 2 shows a sectioned perspective view of the handle portion 2 and a portion of elongated tube member 48 and inner tube member 46. Outer tube 48 is fixed to the end of handle portion 2. Inner tube 48 is able to rotate within outer tube 48. When the user pulls on flip trigger 8 it causes ball chain 38 to pull on rotating pulley 37 thereby causing inner tube 46 to rotate. Chain 38 is threaded around first flipper pulley 40 and then around second flipper pulley 42 and finally into an aperture in trigger 8. Chain end 36 is fixed onto pulley 37. The pulley 37 is caused to return back to its rest position via torsion spring 34, one end of which is attached to housing 2 and the other end of which is attached to pulley 37. A second ball chain 38 resides inside inner tube 46 as well as a conductive cable 50 that leads to temperature measuring and sensing portion 28. FIG. 3 shows a partial section view of the grip and flip portion 2. Gripper ball chain 38 can be seen exiting inner tube 46 winding around a pulley shaped portion in gripping member 14. The chain then terminates at point 62. When the user pulls on gripping trigger 10, the grip member 14 rotates about pivot pin 12 causing a downward rotation of gripping member 14. Gripping member 14 also includes a channel to allow temperature sensor cable 50 to travel up to tip 16. Tip 16 is hollow and houses a thermistor which is capable of sending a change in electrical resistance to a circuit 90 as shown in FIG. 4. So when the grip tip 60 rotates down and penetrates a grilled item, the temperature of that item can be sensed and displayed on LCD display 26. Yoke portion 13 is fixed to the end of inner tube 48 and supports pivot pin 12 as well as spatula member 18. FIG. 4 shows a partial side section view of handle portion 2. Gripper ball chain 38 travels within inner tube 46 and terminates at point 82 within grip trigger 10. Conductive cable 50 also resides inside inner tube 46 and then exits tube 46 and extends within housing 2 and attaches to sensor electronics 90. The electronics 90 and display 26 is are powered by battery power supply 92 and within electronic housing 24. Trigger 10 travels on shaft 44. Torsion spring 34 can also be seen attached to pulley 37. Additionally, bushing 70 can be seen separating inner tube 46 from outer tube 48 and causing them to be in concentric relation to each other. The above description and drawings show that the present invention is a novel way to grip and flip grilled items with ease. The addition of the temperature sensor allows the user to quickly determine whether the grilled item is properly cooked Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:
1. Grip and flip barbeque utensil comprising:
   a handle housing;
   an outer elongated tube;
   an inner elongated tube;
   a first and second bushing;
   a spatula member,
   a food gripping member;
   a pivot shaft for said food gripping member;
   a food gripping tip
   a yoke portion;
   a food gripping torsion spring;
   a food flipping torsion spring;
   gripping ball chain;
   flipping ball chain;
   grip trigger;
   flip trigger;
   first ball chain pulley guide; and
   second ball chain pulley guide;
   said inner and outer tubes concentric with one and other;
   said outer tube fixedly attached at one end to an end of said handle housing;
   said inner tube supported within said outer tube by said first and second bushing;
   said gripping member attached to said and said yoke portion straddling and fixedly attached to the distal end of said inner tube;
   said gripping ball chain attached to said pivoting gripping member and extending within said inner tube to said gripping trigger;
   said gripping member caused to rotate downward toward said spatula member when said gripping trigger is pulled;
   a first chain pulley;
   a second chain pulley;
   said first chain pulley fixedly attached to the outside of said inner tube;
   said second chain pulley attached by a vertical shaft within said hollow handle housing;
   said flipping ball chain threaded around said first and second pulleys so that when when said flipping trigger is pulled
   said gripping member and said spatula member are caused to rotate one hundred and eighty degrees thereby creating a flipping action;
   and said gripping and flipping torsion springs capable of returning said gripping member and spatula member to their original positions.

2. Grip and flip barbeque utensil as claimed in claim 1 further comprising a temperature sensor and associated sensing electronics and temperature display;
   said temperature sensor housed within said food gripping tip and an electrical cable extending from said temperature sensor, through said inner tube to said temperature sensing electronics and display located within said hollow handle housing.

3. Grip and flip barbeque utensil as claimed in claim 1 wherein said spatula member includes a pair of forwardly extending fork tines.

* * * * *